United States Patent
Naumov

(10) Patent No.: US 11,410,015 B1
(45) Date of Patent: Aug. 9, 2022

(54) SYSTEMS AND METHODS FOR TRANSLATING WITH LIMITED ATTENTION

(71) Applicant: Meta Platforms, Inc., Menlo Park, CA (US)

(72) Inventor: Maxim Naumov, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 887 days.

(21) Appl. No.: 16/145,230

(22) Filed: Sep. 28, 2018

(51) Int. Cl.
  *G06N 3/04* (2006.01)
  *G06N 7/00* (2006.01)

(52) U.S. Cl.
  CPC .............. *G06N 3/04* (2013.01); *G06N 7/005* (2013.01)

(58) Field of Classification Search
  CPC ........... G06N 7/00; G06N 7/005; G06N 3/00; G06N 3/02; G06N 3/04; G06N 20/00; G06N 20/10; G06N 20/20
  See application file for complete search history.

(56) References Cited

PUBLICATIONS

Britz et al. "Efficient Attention using a Fixed-Size Memory Representation", Jul. 1, 2017 https://arxiv.org/pdf/1707.00110.pdf (Year: 2017).*

Shim et al. "SVD-Softmax: Fast Softmax Approximation on Large Vocabulary Neural Networks" 2017 https://proceedings.neurips.cc/paper/2017/file/4e2a6330465c8ffcaa696a5a16639176-Paper.pdf (Year: 2017).*

Wang et al. "Relation Classification via Multi-Level Attention CNNs" Aug. 2016 https://aclanthology.org/P16-1123.pdf (Year: 2016).*

Freitag et al. "Beam Search Strategies for Neural Machine Translation" Jun. 14, 2017 https://arxiv.org/pdf/1702.01806.pdf (Year: 2017).*

Bahdanau et al., "Neural Machine Translation by Jointly Learning to Align and Translate", Published as a conference paper at ICLR 2015, arXiv:1409.0473v7 [cs.CL], May 19, 2016, 15 pages.

Brand, Matthew, "Fast Low-Rank Modifications of the Thin Singular Value Decomposition", Mitsubishi Electric Research Laboratories, Retrieved at http://www.merl.com, Lin. Algebra Appl, vol. 415, May 2006, 20 pages.

(Continued)

*Primary Examiner* — Brian M Smith
*Assistant Examiner* — Shoun J Abraham
(74) *Attorney, Agent, or Firm* — FisherBroyles, LLP

(57) ABSTRACT

A computer-implemented method for translating with limited attention a sequence of input tokens into a sequence of output tokens may include (1) encoding by an encoder recurrent neural network (RNN) N input tokens of a sequence of (N+D) input tokens into an attention matrix limited to N input tokens, (2) iteratively updating a previous version of the attention matrix with the context vector generated from each excess input token yielding a final attention matrix at the last excess input token (D), and (3) decoding an output token using a decoder RNN with inputs from at least the weighted context vector and the just previously-determined output token of the decoder. The weighted context vector may be derived from an attention RNN processing the elements of the final attention matrix for each of the decoder output tokens. Various other methods, systems, and computer-readable media are also disclosed.

20 Claims, 5 Drawing Sheets

(56) References Cited

PUBLICATIONS

Bunch et al., "Updating the Singular Value Decomposition", Numerische Mathematik 31, (1978), pp. 111-129.

Mnih et al., "Recurrent Models of Visual Attention", Google DeepMind, arXiv:1406.6247v1 [cs.LG], Jun. 24, 2014, 12 pages.

Neubig, Graham, "Neural Machine Translation and Sequence-to-sequence Models: A Tutorial", Language Technologies Institute, Carnegie Mellon University, arXiv:1703.01619v1 [cs.CL], Mar. 5, 2017, 65 pages.

Vinyals et al., "Grammar as a Foreign Language", arXiv:1412.7449v3 [cs.CL], Jun. 9, 2015, 10 pages.

\* cited by examiner

SYSTEMS AND METHODS FOR TRANSLATING WITH LIMITED ATTENTION

BACKGROUND

Machine translation using artificial neural networks is a newly emerging approach unlike the traditional phrase-based translation systems, the latter consisting of many small sub-components that are separately and finely tuned. Neural machine translation attempts to build and train a single, large neural network system that inputs a sentence and outputs a correct translation.

Most of the neural machine translation models belong to an encoder-decoder family that are trained to translate from a first language into a second language via an intermediate (abstract) internal language. An encoder neural network commonly reads and encodes a source sentence into a fixed-length vector containing the intermediate language. A decoder may then translate the intermediate language from the encoded vector into an output sequence of tokens. An encoder-decoder model, meaning the internal representations, may be jointly trained to maximize the probability of a correct translation.

One of the problems with the encoder-decoder model is that the long-distance dependencies between words are not fully addressed in the formalism. Another of the problems with the basic encoder-decoder paradigm is that the intermediate state is of a fixed size. Thus, a sentence of 100 words may be encoded into an intermediate state of the same fixed size as would a sentence of only 10 words. Thus, with longer sentences, the sensitivity or probability of a correct translation may be diminished.

SUMMARY

As will be described in greater detail below, the instant disclosure describes systems and methods for translating with limited attention by, for example, limiting the size of physical memory utilized by an attention mechanism in a translating computing device. In one example, a computer-implemented method for translating with limited attention may include (1) encoding a sequence of N input tokens of a sequence of (N+D) input tokens into a first attention matrix (i.e., a z=0 attention matrix, where z is an index of the input tokens that are in excess of N input tokens) limited to N input tokens using an encoder recurrent neural network (RNN); (2) decomposing the first attention matrix into singular values with rank reduction; (3) for each input token in excess of N input tokens until an end-of-sequence is sensed at D+1 input tokens: (i) encoding the current excess input token (i.e., a z-th excess input token) into a current excess context vector (i.e., a z-th excess context vector with an index of z), (ii) appending the current excess context vector as an update column to previously-determined attention matrix (i.e., a (z−1)-th attention matrix) to form an extended attention matrix, and (iii) decomposing, with rank reduction, the extended attention matrix into a current attention matrix (i.e., a z-th attention matrix), and repeating this sequence (i)-(iii) until a final attention matrix (i.e., a D-th attention matrix) has been obtained with a final input token of D, and (4) decoding a sequence of decoder output tokens. The sequence of decoder output tokens may be output by, for each sequential decoder output token of the sequence of decoder output tokens, (i) processing, at each current decoder output token, the final attention matrix to generate a weighted context vector and (ii) decoding the current decoder output token with a decoder RNN with inputs including at least the weighted context vector and a decoder output token generated immediately before the current decoder output token.

According to some embodiments, the method may also include deriving the weighted context vector by (1) processing the final attention matrix with an attention RNN into a set of scores, (2) converting the set of scores into a set of probabilities, (3) processing each column of the final attention matrix with a probability from the set of probabilities, and (4) processing the columns of the final attention matrix to yield the weighted context vector. In these examples, at least one of the encoder RNN, the attention RNN, or the decoder RNN may include a plurality of RNNs, each RNN with its own set of intermediate states and one or more memory cells. Additionally, or alternatively, at least one of the encoder RNN, the attention RNN, or the decoder RNN may include a plurality of long short-term memory layers (LSTM) arranged in a stack. In some examples, only the largest scores above a predetermined limit may be converted into the set of probabilities and all scores lower than the predetermined limit may be set to zero, ignored, or dropped.

In various embodiments, each of the extended attention matrices may be determined by at least one of a compact singular value decomposition, a truncated singular value decomposition, a thin singular value decomposition, a QR decomposition, or a principal component analysis. In at least one example, the encoder RNN may be bi-directional. In certain varieties of singular value decompositions, there is a matrix rank reduction, e.g. k to k', where k'<k. The sequence of input tokens may include at least one of language-based text or audio signals.

A corresponding system for translating with limited attention a sequence of input tokens into a sequence of output tokens may include (1) an encoder module including an encoder RNN, stored in memory, that encodes, stepwise, sequentially each of the input tokens a sequence of N input tokens of an input sequence containing (N+D) input tokens into a first attention matrix limited to N tokens, (2) an attention matrix module, stored in memory, that processes each of the set of N intermediate states into a set of context vectors to form a first attention matrix; then for each subsequent excess input token until the end-of-sequence token has been sensed and using the encoder module as a subsystem, for each excess input token, taken stepwise, the encoder module processes a current excess input token into a current context vector, which is appended to the previously-determined attention matrix into an extended attention matrix; the extended attention matrix may then be decomposed with rank reduction into a current attention matrix; this procedure may be repeated until an end-of-sequence has been sensed, at an input token of D+1; the last or final attention matrix may be the one decomposed with the last of the excess input tokens D. (3) a decoder module including a decoder RNN, stored in memory, that decodes a sequence of decoder output tokens; and (4) at least one physical processor configured to execute the encoder module, the attention matrix module, and the decoder module. The decoder module: (i) processes at each current decoder output token the final attention matrix to generate a weighted context vector and (ii) decodes a current decoder output token with a decoder RNN with inputs including the weighted context vector and a decoder output token generated immediately before the current decoder output token.

In various embodiments, the decoder module may further interact with an attention RNN module having an attention RNN that (1) processes the final attention matrix into a set of scores, (2) converts the set of scores into a set of probabilities, (3) processes each column of the final attention matrix with a probability from the set of probabilities, and (4) processes the columns of the final attention matrix to yield the weighted context vector.

In some examples, at least one of the encoder RNN, the attention RNN, or the decoder RNN may include a plurality of RNNs, each RNN with its own set of intermediate states and one or more memory include. In some examples, the encoder RNN may be bi-directional. Additionally, or alternatively, only the largest scores above a predetermined limit may be converted into the set of probabilities and all scores lower than the predetermined limit may be set to zero.

Additionally, or alternatively, at least one of the encoder RNN, the attention RNN, or the decoder RNN may include a plurality of long short-term layers (LSTM) arranged in a stack. In various examples, the at least one physical processor may be included in at least one of a CPU, a GPU, a FPGA, an ASIC, or specially designed circuitry to function as at least one of the encoder module, the attention matrix module, the attention RNN module, or the decoder module. In at least one embodiment, the attention matrix module may decompose, for each sequential excess input token, the previously-determined attention matrix into a lower rank of the current attention matrix using at least one of a compact singular value decomposition, a truncated singular value decomposition, a thin singular value decomposition, a QR decomposition, or a principal component analysis.

In some examples, the above-described method may be encoded as computer-readable instructions on a non-transitory computer-readable medium. For example, a computer-readable medium may include one or more computer-readable instructions that, when executed by at least one processor of a computing device, cause the computing device to (1) encode a sequence of the first N input tokens of a sequence of (N+D) input tokens into a first attention matrix limited to N input tokens using an encoder RNN; in which the first attention matrix is decomposed into singular values and the rank of the matrix is reduced, and (2) for each input token in excess of N input tokens until an end-of-sequence is sensed at D+1 input tokens, (i) encode, stepwise and sequentially, each of the current excess input tokens into a current context vector, which is appended or concatenated to the previously-determined attention matrix to form an extended attention matrix and (ii) decompose with rank reduction the extended attention matrix into the current attention matrix, and repeating this sequence until a final attention matrix has been derived with the final input token of D; and (4) decode using a decoder RNN, each decoder output token sequentially, and (i) process at each current decoder output token the final attention matrix to generate a weighted context vector and (ii) decode a current decoder output token with a decoder RNN with inputs including the weighted context vector and a decoder output token generated immediately before the current decoder output token.

In at least one embodiments, the weighted context vector may be derived by (1) processing the final attention matrix with an attention RNN into a set of scores, (2) converting the set of scores into a set of probabilities, (3) processing each column of the final attention matrix with a probability from the set of probabilities, and (4) processing the columns of the final attention matrix to yield the weighted context vector.

Features from any of the above-mentioned embodiments may be used in combination with one another in accordance with the general principles described herein. These and other embodiments, features, and advantages may be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
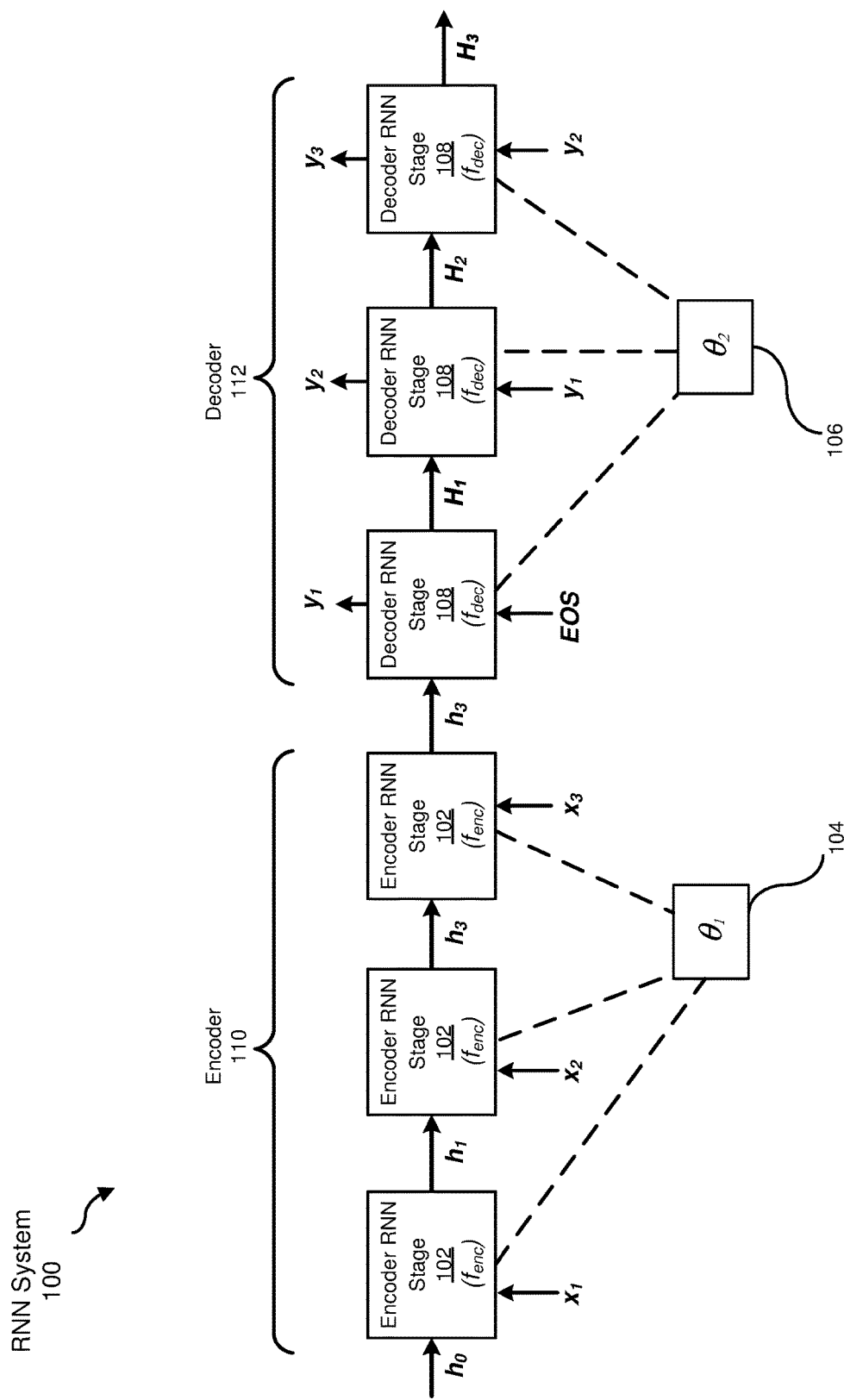
FIG. 1 is a block diagram of an exemplary encoder-decoder neural network, in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and may be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for translating with limited attention in the encoder-decoder formalism with constrained physical memory resources. According to various embodiments, "attention models," as generally described herein, "attend" to specific parts of an image in sequence, one after another. By relying on a sequence of attentive glances, they may capture substructure in an overall structure. This type of sub-processing, which may rely on a recurrent network to process sequential data, may be contrasted with other machine vision techniques that typically process an entire sensory input in a single, forward pass. As will be explained in greater detail below, by constraining a set of values associated with an attention mechanism of an encoder-decoder translation to stay within the boundaries of the physical memory allocated to it, the systems and methods described herein may provide a way to avoid operational failures due to insufficient physical memory resources when the size of the input sequence or sentence to be translated has exceeded a maximum value. In some examples, part of the encoder-decoder model described herein may include a set of attention weights, which may be formalized as a vector, matrix, or tensor, and may provide guidance to the decoder, concomitantly with the output of the encoder, as to what should be emphasized in the input sentence during the sequential operations of the decoder.

The approach to prevent translation failures due to exceeding the allocated physical memory resources may involve limiting the size of the mathematical attention representation to pre-determined maximum size, e.g., a maximum attention matrix size. This number is pre-assigned, and is determined, in part, based on the actual size of the physical memory available in a computing device, such as a mobile device. Thus, the anticipated size of the input sentence or sequence may be an important input factor in determining the extent of the allocated physical memory.

The systems and methods of machine translation presented herein may include a plurality of recurrent neural networks. In some examples, the term "neural network," as used herein, may refer to a physical or virtual computing system that contains a collection of connected nodes. In some embodiments, nodes may be organized into layers and may be connected to some or all nodes in adjacent layers. In some embodiments, the connections between nodes may be regulated by a weight that the receiving node assigns to information from the sending node. In one embodiment, weights, and therefore the organization of and connections between nodes, may be represented as numerical data stored in a set of matrices. In some examples, weights may be expressed as integer values, while in other examples, weights may include non-integer values.

In some examples, the term "node," as used herein, may refer to a mathematical function that represents an artificial neuron within a neural network. In some embodiments, a node may receive one or more inputs from nodes in another layer, apply an activation function to the input, and send the result to one or more additional nodes in a different layer. In some embodiments, a node may also receive input in the form of a bias, a static term that is added to all output produced by the node. In some examples, a bias may be used to perform an affine transformation on data produced by the node and/or the neural network. In some embodiments, all nodes within the same layer may have the same bias. In one embodiment, bias information for a layer of nodes may be stored alongside weight information for the layer of nodes.

A neural network in machine learning or translation may be modelled on the neural networks of the brain, which includes neurons (nodes) and axons (interconnections between nodes). Neural networks are typically arranged in at least three sets of layers: input, hidden, and output. Each layer may include one or more artificial neurons or nodes. Nodes may be interconnected with other nodes in a subsequent layer until the output layer has been reached. Each node subsequent to the input may have the ability to adjust the input to that node. These adjustments may be performed by an activation function, a weight (equivalent to the biological synapse), and a bias and these may be used to transform input information into output data. It is this set of transforms which may convert a neural network into a parameterized system. Typical activation functions include linear, step, sigmoid, softmax, tanh, and rectified linear unit. The weights may be assigned or determined during a training session where other parameters are also adjusted so that the difference between a given input and its expected output is minimized. The nodes of hidden layers may be connected to other nodes of additional hidden layers, with each node of subsequent hidden layers also providing adjustments. The set of nodes within a given layer may not be fully connected to the nodes of the subsequent layer. The output(s) of the final node(s) of the last hidden layer(s) may then be combined into the final, and observable, output. The neural network so described may be operated in a feed-forward manner. This means an input may be processed only in one direction from input until a final output is produced and presented. This approach may mean, for example, that what has transpired earlier in the neural network is not known or recognized later in the network, meaning there is no memory mechanism (i.e., it possesses what might be comparable to amnesia). However, a modification of the design of the neural network may allow that which is downstream to have some recollection as to what has transpired upstream.

In some embodiments, there may be at least two variations on the style of RNN; that of long short-term memory (LSTM) and that of a gated recurrent unit (GRU). In the former exemplar, LSTM, memory cells (vector or matrix) may be introduced as part of the intermediate state representation. Access to these memory cells may be controlled by gating components—smooth mathematical functions that simulate logic gates. At each input state, a gate may be used to decide how much of the new input should be written to the memory cell, and how much of the current memory cell should be forgotten. An exemplar of the GRU may be based on a gating mechanism, but with fewer gates and without a separate memory component in comparison with an LSTM. In some examples, there may be a plurality of LSTM layers in either or both of decoder and encoder RNNs. In some embodiments, a subset of the plurality of LSTM layers may be used in a forward direction. In some embodiments, another subset of the plurality of LSTM layers may be used in a backward direction. In some embodiments, yet another subset may be used in both a forward and a backward direction. In some embodiments, the attention RNN may include LSTMs or other memory cells.

In some embodiments, an RNN may be comparatively treated as a transducer, producing an output for each input. In some exemplars, bidirectional RNNs may be used, where in addition to the expected forward input, a reversed (i.e., backwards) input may be also processed. Other variations may include inputting a one-hot vector into the RNN, in which an embedding matrix may be internal to the RNN, using embedded representations. While the output of an RNN may be assumed to be a vector, which may be expected to be fed by additional layers followed by a function (e.g., softmax), for prediction, in some exemplars, this function may be part of the RNN itself. In a multi-layer RNN, the intermediate state vector may be either the output of the last layer, or a concatenation of the outputs from all layers.

When constructing such an RNN in a physical environment of, for example, a mobile computing device, the maximum dimensions of the input vectors $x_i$ and the output vectors $y_i$ may have to be specified in advance. While the dimensions of the input set, the intermediate state set, and the output set of vectors have been assumed to be different (m, k, and n, respectively), each may have the same dimensionality. These dimensionalities may be needed to allocate the requisite physical memory for the computations. This may be especially critical in physical computation environments such as mobile devices and graphic processing units (GPU), for example.

An exemplary abstract encoder-decoder recurrent neural network (RNN) system 100 of is presented in FIG. 1. In this exemplary RNN system 100, the recurrent nature of an encoder 110 and a decoder 112 in RNN system 100 is expanded to depict the relationships between the inputs and outputs of the encoder-decoder network more fully. The exemplary sequence in encoder 110 and decoder 112 depicted in FIG. 1 may be complete, or it may be a sub-sequence in a longer sequence. The sequential input to the RNN system 100 may be represented by an ordered series of $x_i = (x_1, x_2, \ldots, x_m)$, where each $x_i$ could represent individual tokens, words, vectors, matrices, and/or tensors. In addition, an initial intermediate state entity, $h_0$, which may be in the form of a vector or matrix, may also be initially input to the first pass through encoder RNN stage 102 of encoder 110, as is vector $x_1$. While FIG. 1 illustrates an encoder RNN stage 102 utilized multiple times by encoder 110 and a decoder RNN stage 108 utilized multiple times by decoder 112, encoder 110 and/or decoder 112 may utilize a plurality of encoder RNN stages and/or decoder RNN stages. Additionally, or alternatively, data (e.g., input vectors $x_i$ and/or output vectors $y_i$) may be run through encoder RNN stage 102 and/or decoder RNN stage 108 a fewer or greater number of times than that illustrated in FIG. 1.

In the mathematical formalism illustrated, for example, in FIG. 1, encoder function $f_{enc}$ utilized in encoder RNN stage 102 of encoder 110 may be a recursively defined function that takes, as an input, an intermediate state vector $h_i$ and an input vector $x_{i+1}$, and creates a new intermediate state vector $h_{i+1}$. This recursive use of $f_{enc}$ in encoder 110 is represented by the multiple instances of $f_{enc}$ of encoder RNN stage 102 shown in FIG. 1. A decoder function $f_{dec}$ utilized in decoder RNN stage 108 of decoder 112 may be recursively used to transform the intermediate state vector $h_i$ from encoder 110 (e.g., $h_3$ output from encoder 110 as illustrated in FIG. 1) into an output vector $y_i$. The product of the decoder 112 may be a set of ordered output vectors $y_i=(y_1, y_2, \ldots y_n)$, which are assumed, in this example, to be vectors, and a set of ordered hidden state vectors, $H_i=(H_1, H_2, \ldots, H_k)$.

The input vectors $x_i$ may be presented to the encoder RNN stage 102 of encoder 110 in a sequential fashion. The set of output vectors $y_i$ may be derived from the function $f_{dec}$ utilized in decoder RNN stage 108 processing the ordered set of hidden state vectors $H_i$. The intermediate state vectors $h_i$ and hidden state vectors $H_i$ and the output vectors $y_i$ may respectively represent the states of the encoder 110 and the decoder 112 after processing the input vector $x_i$ into $y_i$. As illustrated in FIG. 1, the output vector $y_i$ at each decoder RNN stage 108 of decoder 112 may be used for further prediction of the next output vector $y_{i+1}$ in the output sequence. In some embodiments, the sequence may continue until a specified end-of-sequence (EOS) marker has been sensed. In some embodiments, one of the several inputs to $f_{dec}$ may be the last output of the $f_{enc}$.

Thus, in summary of this model, the encoder 110, using the encoder RNN stage 102, may read each token sequentially using a trained $f_{enc}$ and produce a sequence of intermediate state vectors $h_i$. With each token in the input sequence, the intermediate state may be updated until a stop signal, such as an EOS token, is sensed. The final intermediate state (e.g., intermediate state vector $h_3$ shown in FIG. 1) may be a summary of the context of the entire input sequence of vectors $x_i$. In this model, the next step is with the decoder 112, which uses a trained $f_{dec}$ to generate the output sequence by predicting the next output vector $y_{i+1}$ at each decoder RNN stage 108 given the intermediate state $h_i$ produced by the encoder 110 or the hidden state $H_i$ produced by each corresponding prior decoder stage 108 pass of the decoder 112.

A basic encoder-decoder model may not allow for structured information in the input sentence to pass from the encoder to the decoder. This particular problem may be overcome with an attention mechanism, interposed between the encoder and the decoder, which permits structured information to pass from the input sentence into the output sentence and does so by controlling the decoder's selection for output token.

Activation functions, matrices, and bias terms that define the transformations for encoder 110 and decoder 112 of RNN system 100 may be the parameters 104 and 106, respectively, of the network and may be commonly designated as $\theta_1$ and $\theta_2$. These parameters $\theta_1$ and $\theta_2$ may be determined by minimizing a loss function over a training set, often using a gradient-based method, such as a stochastic gradient descent or one of its variants. When training a neural network, a parameterized function $f$ may represent the neural network, and the parameters $\theta_1$ and $\theta_2$ may be the layer-transfer matrices, bias terms, and any other appropriate contribution to the functional formulation. Often a back-propagation algorithm may be used which computes the derivatives of a complex expression using the chain-rule, while storing intermediate results, which may be a form of reverse-mode auto-differentiation.

A problem commonly associated with the encoder-decoder paradigm may be that the intermediate states may often be represented mathematically as a vector of fixed size. Thus, an input sequence of 100 tokens may be encoded into an intermediate state of fixed size as would a sequence of only 10 tokens. With progressively longer inputs, the sensitivity or probability of a correct translation may be being diminished. The mechanism of attention may overcome this particular problem.

Attention, in a human experience, commonly refers to concentrating on a portion of sensory input while being less aware of the remaining portion. In other words, the portion of the input may be treated with a higher resolution analysis than the remainder of the sensory input, which is treated at a lower resolution. The sensory input may be textual, semantical, verbal, visual, audio, and tactical, or a combination of these. While the disclosures contained herein are appropriately applicable to the use of the attention mechanism in any encoder-decoder system, the discussion contained hereinbelow may emphasize that of machine translations.

Incorporating an attention mechanism into the encoder-decoder framework allows for improved translations, as translations may not be always rigidly sequential between input and output. There may be a spatial relationship between non-adjacent tokens in a sequence, moreover, subsections of the sequence may correlate better with each other than individual tokens do. In part, the problem may be that correlation between tokens in the input sequence and the correlation between similarly placed tokens in the output sequence are not themselves well correlated. In the example of a sentence as input, a typical English sentence has the verb normally following the subject near the beginning of the input sequence. However, in German, oftentimes the translated verb may be found at the end of the equivalent sequence, at least in formal writing.

Expanding on the encoder-decoder model elaborated hereinabove, a more effective mechanism for machine translation may be one based on at least two RNNs, each of which may have a separate function: at least a first RNN may function as an encoder RNN stage 102 as part of encoder 110 (see, e.g., encoder module/encoder subsystem 408 in FIG. 4), and at least a second RNN may act as a decoder RNN stage 108 as part of decoder 112 (see, e.g., decoder module 414 in FIG. 3). Within this encoder-decoder framework, and in more general terms, a first step in the machine translation process may be that the encoder 110 returns a continuous-space representation of the input vector x: $c=f_{enc}(x)$, where the functional form of the encoder function $f_{enc}$ is dependent on the type of input. The input data could be an audio signal, a sequence of words such as in a sequence, an image (e.g., multi-dimensional images), or a spoken sequence. For example, a sequence of input tokens may include language-based text or audio signals that are to be translated from one language to another.

Subsequent to the processing by the encoder 110, the decoder 112 may generate a sequence y of output tokens, adapted or educated by the continuous-space representation, or context c, of the input. This may be equivalent to computing the conditional probability of y given x, p (y|x)=$f_{dec}$(c). The output may be dependent on the structure of the decoder function $f_{dec}$(c).

In less general terms, the encoder 110 may input a sequence of tokens (or words), represented by x=($x_1$, $x_2$, . . . , $x_m$) and the encoder 110 may produce an intermediate state of the input sequence in the mathematical form of a vector, which may be then input into the decoder 112, which uses the hidden states of the decoder 112 to produce the desired output sequence, y=($y_1$, $y_2$, . . . , $y_n$). As an RNN is recurrent, the current encoder 110 intermediate state or decoder 112 hidden state may be updated with the processing of the next token. In either the encoder process or the decoder process, start and stop (e.g., EOS) signals may be present that bracket the input or output sequence, respectively.

In some embodiments, the encoder RNN stage 102 and/or the decoder RNN stage 108 may be jointly trained to maximize the probability of a correct translation of a given input in a first specified language into a second specified language. This basic encoder-decoder model may not allow for structured information in the input sequence to pass from the encoder to the decoder. This particular problem may be overcome with an attention mechanism, interposed between the encoder and the decoder, but operating mostly in conjunction with the decoder operation. The attention mechanism may permit structured information to pass from the input sequence into the output sequence and may do so by controlling the input to the decoder, or alternatively, how the decoder is configured to evaluate the current output token. In some embodiments, the attention mechanism may be part of the decoder process or system.

Figure 2:
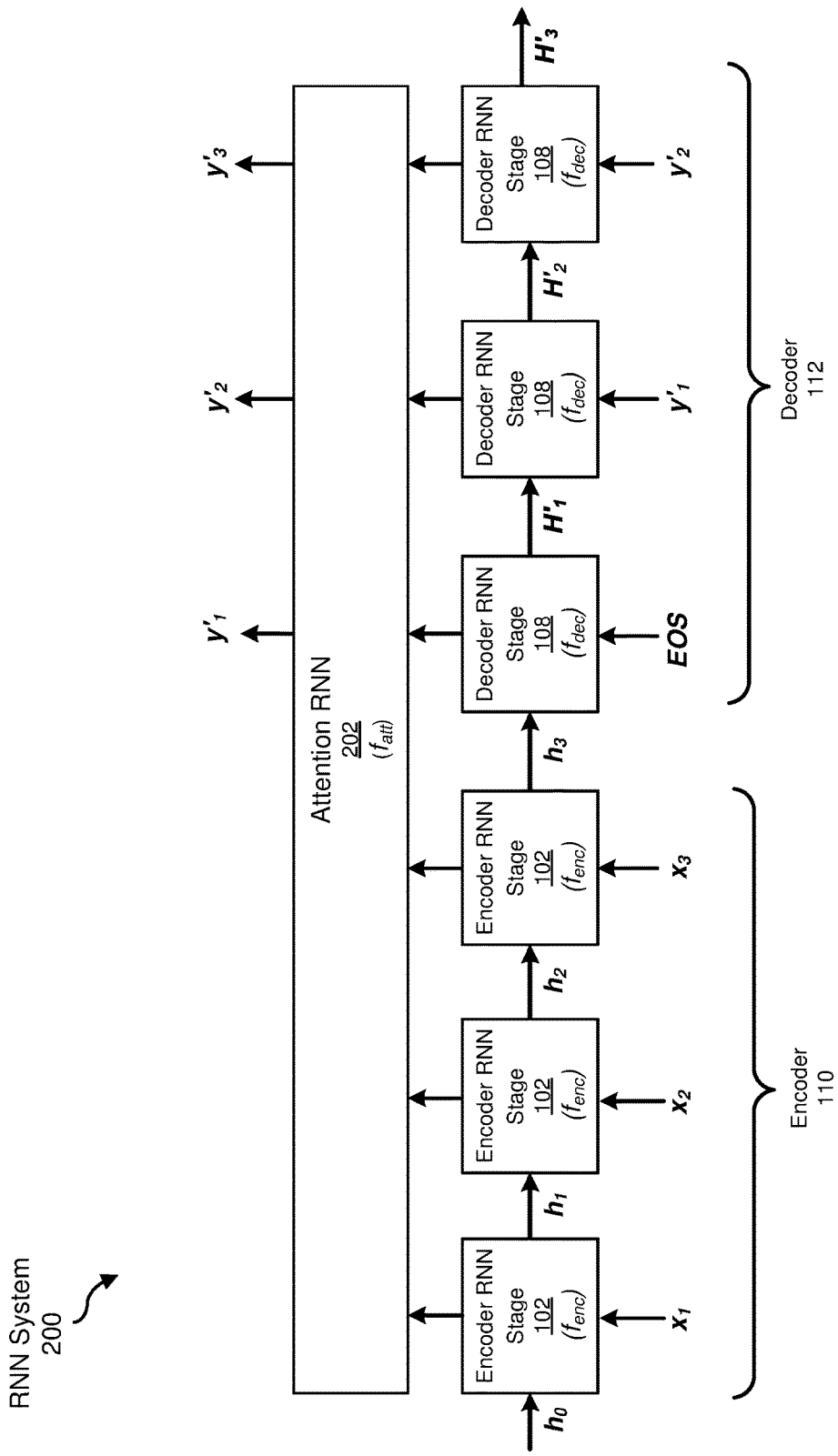
FIG. 2 is a block diagram of an exemplary encoder-decoder neural network with attention, in accordance with some embodiments.

FIG. 2 illustrates an exemplary RNN system 200 that includes an attention layer. For example, as shown in this figure, RNN system 200 may include an attention RNN 202, which may include one or more RNNs. In some embodiments, an exemplary attention model may be composed of two distinct aspects: alignment and translation. Alignment may relate to a problem in machine translation that identifies those parts of the input sequence that are relevant to each word or token in the decoder 112 output. Translation may then be the process of using the relevant information to select the appropriate output. Each time the exemplary attention model generates an output token in a translation, it may search for a set of positions in the input sequence where the most relevant information (to that particular output word) may be located.

The relevant information may be provided by a set of attention weighted context vectors, which collectively processed, yield a weighted context vector. In some embodiments, the attention model may include at least one RNN. In alternative or additional embodiments, the attention model may include a plurality of LSTMs.

Instead of encoding the input sequence into a single fixed-size context vector, the exemplary attention model may develop a set of context vectors, each of which may be filtered or weighted specifically for each output token. The mathematical formalism of attention may be exemplarily parameterized by a set of fixed-sized context vectors, $c_i$=($c_1$, $c_2$, . . . , $c_L$), where L may be dependent upon the input sequence, such as the number of input tokens. Each $c_i$ may be localized to a certain spatial, temporal, locational position of the input. In an exemplar of machine translation, each context vector may summarize a set of tokens centered upon a specific token in the input sequence. In some embodiments, the set of context vectors may be the set of intermediate states created by the encoder RNN stage 102.

However, an attention value in this exemplary attention mechanism may be calculated for each combination of an encoder 110 input token $x_i$, and/or combinations of tokens, with each decoder 112 output token $y'_i$. This may impose significant requirements on the memory resources available in the computing device, such as exemplary devices of a mobile device or a GPU. As the length of the input sequence increases, it may be assumed that the output sequence would grow similarly in size, the number of attention values would also grow on the order of M×N, with M words in the input sequence and N words in the output sequence. This quadratic relationship on memory usage may imply that the available memory may be quickly exceeded, causing an unfortunate failure.

In summary, the exemplary attention model may predict a target or output token based on the context vectors with these input positions and all the previous generated output tokens. If an input sequence may be represented, in this example by a vector, such as x=($x_1$, $x_2$, . . . , $x_m$), where $x_i$=an input word or a token, and i represents a time or sequential step, the intermediate states of the encoder 110 represented, in an example as a vector, by h=($h_1$, $h_2$, . . . $h_K$), and the target, or output sequence by y=($y_{1'}$, $y_{2'}$, . . . , $y_{N'}$), then with attention, each token $y'_i$ output from the decoder 112, via the attention RNN 202, may be derived from a weighted combination of all the previous encoder 110 intermediate states $h_i$, (or the set of context vectors $c_i$) and not just the last state, as has been traditionally done. Each context vector of the set of context vectors may be weighted, to yield a weighted context vector, with regards to the current state of the decoder 112. For example, each context vector in the set of context vectors may be weighted with a value, $a_i$, that defines or represents the relevancy of that context vector to the each of the output steps $y'_i$. For each location i, an attention weight $a_i$ may be interpreted as either the probability that location i may be deserving of an emphasis for producing the next word, or the relative importance to give to location i based upon an admixture of attention weights. The dimensions M, K, N given hereinabove may be of the same value or different values.

By this methodology, access to all of the intermediate states $h_i$ and/or hidden states $H'_i$ by the decoder 112 may be arranged and the decoder 112 may choose what to retrieve. Each intermediate state $h_i$ and/or hidden state $H'_i$ may be scored using a neural network of the exemplary attention RNN 202, which may be normalized to be a probability over the intermediate states $h_i$ and/or hidden states $H'_i$. Finally, these probabilities may be used to calculate a weighted sum of the set of intermediate states $h_i$ and/or hidden states $H'_i$ to provide an updated or current weighted context vector to be used as part of the input to each respective decoder RNN stage 108 of the decoder 112 to determine $y'_i$ (i.e., the current token or weighted context vector referring to those inputs at the current or present time step or the current position in the sequence of steps of processing the sequence of output tokens.)

A weighted context vector may be constructed specifically for each output token in an output sequence. Each encoder 110 intermediate state $h_i$ may be scored using the attention RNN 202, then normalized to a probability by using a special function over all possible or used intermediate states. The intermediate state $h_i$ may be represented by a context vector $c_i$. In some embodiments, the special function may be softmax.

In some embodiments, an entire set of intermediate states $h_i$ of the encoder 110 may be used in determining the set of context vectors. In other embodiments, a portion of the set of intermediate states $h_i$ may be used in the determination. In an alternative of the latter example, given the set of attention weights, attention weights below a predetermined value may be set to zero. Thus, an intermediate state $h_i$ weighted with zero may contribute nothing to a weighted context vector.

As previously indicated, an exemplary attention mechanism may control the input processed by the decoder 112 and this may require at least one neural network, $RNN_{att}$ (e.g., attention RNN 202), which utilizes an exemplary attention function $f_{att}$ (see, e.g., $f_{att}$ in either FIG. 2 or FIG. 4) and which performs the task of determining a mathematical relevancy of each of the set of context vectors $c_i$ with respect to the current hidden state of the decoder 112, meaning the condition of the decoder 112 at the current time step or current position in the sequentially executed decoding process. In an exemplary model, a score correlated to probability may be determined using attention RNN 202, which may be a neural network conditioned on the immediately previous hidden (decoder) state $H'_i$, and the set of attention weights (elements of an attention matrix) computed at the previous time step or current time step, from the scores through a function that normalizes their summation to 1 (e.g., softmax). Thus, the scores may be converted into probabilities. Alternatively, or additionally, one of the inputs $y'_i$ to the decoder 112 at the current time step may be the immediately previously output vector $y_{(i-1)}$ of the decoder 112. In some embodiments, the attention matrix may be formed from the vectors of the individual intermediate states $h_i$ of the encoder 110, or some portion or combination thereof.

This type of scoring may be equivalent to assigning a probability to each context vector (i.e., components of an attention matrix) for the current state of the decoder 112. With the calculation of the attention weights, these may be used to compute an updated or current context vector using a function that returns the weighted context vector summarizing the whole context set c according to the attention weights for a particular decoder RNN stage 108. A choice for this function may be a simple weighted sum of the context vectors as indicated hereinabove; however, other choices may be easily possible. An alternative is to select a set of weights above a predetermined value, while setting the weights below that predetermined value to zero.

Thus, the information loss of using a fixed-length vector to represent the output of the encoder 110 may be overcome with the attention mechanism. Moreover, this may allow computing the context vector at each time step of the decoder 112 and the problem of a fixed-size vector as output of the encoder 110 may be rendered moot. In some embodiments, the initial input value of the decoder 112 hidden state may be the last output of the encoder 110 intermediate state (e.g., $h_3$ in FIG. 2).

In some embodiments, attention RNN 202 may be a multilayer perceptron. In other embodiments, attention RNN 202 may include one or more LSTMs. In some embodiments, attention RNN 202 may be jointly trained along with one or more encoder 110 RNNs (e.g., encoder RNN stage 102) and one or more decoder 112 RNNs, (e.g., decoder RNN stage 108) including any LSTMs that may be present in either the encoding process or in the decoding process.

In many applications, physical memory of a mobile device, GPU, or equivalent processor may need to be statically allocated prior to executing the translation methodology. There may be several reasons for this: (i) it may be inefficient (or unsafe) to allocate memory real-time; (ii) a static mapping of computation to available resources may be required; and (iii) there may be, quite often, limited available memory (on some accelerators, mobile, and other devices).

The size of an attention matrix may depend on the length of the input sequence, which may be unknown in advance. Therefore, it may be dubious to expect to allocate static memory for this matrix a priori, at least not without allocating all the available memory for it. Should the computations exceed the allocated memory, the method or system executing the method may fail.

A solution to overcome this difficulty may lie in reducing the size of the attention matrix of attention RNN 202. In order to avoid catastrophic failure in exceeding the allocated physical memory, an attention matrix A of rank(A)=r≤min(p,q), where p and q are the respective numbers of columns and rows, may be decomposed and approximated by a matrix that is reduced by a rank-k update. In some embodiments, the number of columns may be equal to the number of input tokens.

This decomposition and/or update may be using several possible approaches, one of them being the singular value decomposition (SVD), or, in some embodiments, a compact, thin, or truncated variation thereof. In linear algebra, an attention matrix, A, may be decomposed into three separate matrices, thusly: A=U(p,r) S(r,r) $V^T$(r,q), or elementwise, $A_{pq}=U_{pr}S_{rr}V^T_{rq}$. Here U is the left orthonormal matrix, S is a diagonal matrix containing the singular values, and V is the right orthonormal matrix. In this decomposition, the matrices U and V may provide rotations, translations, and scaling to achieve an S-matrix that possesses only non-zero elements along the diagonal. The attention matrix A may be the set of intermediate states in which each input token has been transformed by the encoder RNN into a vector. The assemblage of intermediate states (or context vectors, $c_i$) forms the attention matrix A, thus A=[$h_1$, $h_2$, . . . , $h_p$], for p input tokens. Accordingly, the attention matrix may include columns, in which each column is a context vector generated sequentially from each input token.

While the use of SVD (thin, compact, truncated) may be to normalize the data, it may also be used to eliminate redundant, or highly correlated data, and this may be used for dimensionality reduction. In the present situation, reduction of the size of the S-matrix may be used to prevent a problem in that the required physical memory is larger than the allocated physical memory. In some embodiments, the elements of the S-matrix less than a certain value may be set to zero, and the matrix rank accordingly reduced. In some embodiments, other mathematical approaches to reduce the rank of A are also possible, such as Householder, QR decomposition, principal component analysis (PCA), or eigenvalue decomposition (which requires a p=q).

In a thin SVD, where attention matrix $A_{pq}=U_{pq}S_{qq}V^T_{qq}$, only q column vectors of U may be retained, meaning those that correspond to the row vectors of $V^T$ are calculated. The remaining column vectors of U may be ignored.

In a compact SVD, where attention matrix $A_{pq}=U_{pr}S_{rr}V^T_{rq}$, only r column vectors of U and r row vectors of $V^T$ may be calculated. These correspond to the non-zero singular values of $S_{rr}$. As a reminder, r is the rank of the attention matrix $A_{pq}$.

In a truncated SVD, where attention matrix $A_{pq}=U_{pt}S_{tt}V^T_{tq}$, where t column vectors of U and t rows of $V^T$ are retained, these retained vectors may correspond to the t largest singular values of $S_{tt}$ and the remaining elements of S may be removed.

The inner dimension k of attention matrix $A_{pq}=U_{pk}S_{kq}V_{qn}$ may be determined by noticing that any approximation must fit into the originally allocated physical memory: $[p \times k]+[q \times k]+[b \times (p+q)] \leq [p \times q]$ and thus $[k+b] \leq (p \times q)/(p+q)$, where b is a factor that corresponds to the additional auxiliary physical memory required for computation of the approximation.

As the input sequence length increases from N to (N+D) input tokens, where D may be unknown until an end-of-sequence is sensed in the input (at input token D+1), the inner dimensions may need to be reduced at each iteration of processing the next excess input token. This may be done so as to continue to accommodate the current approximation in the same originally allocated physical memory, $[(p \times k')+(q+d) \times k'] \leq (p+q) \times k$, and thus $k' \leq \text{FLOOR}\,[(k \times (p+q)/(p+q+d))]$. Once the inner size k' has been chosen, an update to the existing SVD using one or more algorithms may be possible, in at least one embodiment. The longest sequence that may be represented is 'd' tokens longer. (If $p \approx q$, then the increase is quadratic in length: $[p \times 1]+[(q+d)] \times 1 \leq [p \times q]$, where b=0 (i.e., ignoring auxiliary physical memory required for the computations); thus, $(p+d) \leq (p-1) \times q$. The approximation may allow for gracious degradation of the attention mechanism.

In an example of one additional or excess input token, d=1, the A matrix may be updated with a new column, and a row of zeroes may be appended to the right orthonormal matrix V. For low rank matrices (e.g., column or row), and those having good low rank approximations, a thin SVD may be computed through sequential column updates. Thus, operations on the last column or on all columns expressed as rank-1 modifications of an SVD $USV^T=A$ to give an updated $U'S'V'^T=A+CX^T$, where C=a column vector, and $X^T=[0, \ldots, 0, 1]$. Thus, attention matrix A may be augmented with a new column C, a row of zeroes may be appended to V and then the rank-1 modification given hereinabove may be computed, yielding an increment to the reduced augmented diagonal matrix.

In an example of multiple excess input tokens, each new context vector $C_z$, where z is an index of those input tokens that are in excess of N input tokens, may be appended to the existing A matrix as a column: $[A(z-1), C(z)]$. Thus, $[A(z-1), C(z)]=U_zS_zV_z^T=A(z)$, where A(z)=the current state of the attention matrix. An equivalent statement would be that in order to update the A matrix with a new column, a row of zeroes is appended to V, and then a rank-1 modification is determined $U'S'V'^T=[A(z-1), 0]+C(z)[0, \ldots, 0, 1]$. By convention, if z=0, then $A(z=0)=A$, $U_0=U$, $K_0=S$, and $V_0=V$ as given hereinabove. An index of z=1 indicates the first excess token after the first N input tokens.

For each excess input token, the following steps may be repeated until an EOS has been sensed. A series of matrices, K(z) matrices, may be sequentially generated, each identified by an index z=1, 2, . . . , D. The submatrix within each new sequential K(z) matrix may be the previously-determined $S_{z-1}$ matrix. Other elements of each K(z) matrix may be populated with modifications of the current context vector, C(z), and of $U_{z-1}$ and $V_{z-1}$. For the value of z=1, the initial $S_{(z-1)}=S_0$ is the matrix=S, which is the diagonal matrix containing the singular values of the maximum-sized attention matrix containing N columns prior to any k-rank reduction procedure. The K(z) matrix may be constructed as:

$$U_z S_z V_z^T = \begin{bmatrix} S_{z-1} & m_z \\ 0 & \|p_z\| \end{bmatrix} = K(z).$$

Diagonalizing K(z) yields $S_z$, $U_z$, and $V_z$, as $S_z=U_z^T K_z V_z$, where $C(z)=C_z$, $m_z=U_z^T C_z$, $p_z=C_z-U_z U_z^T C_z$. From these relationships, the following may be generated: $U_z=[U_{z-1}, p_z]^T U_{z+1}$, $V_z=[V_z, q]V_{z+1}$, where $$q = \frac{b}{\|b\|_2}, b = [0, \ldots, 0, 1].$$

where Thus, for each new input token that is in excess of the preset maximum number of tokens for the attention matrix, there may be an update to the singular values so obtained. The K(z) matrices may be sparse and thus diagonalized. Thus, for lower-rank matrices and those having good lower rank approximations, a thin or compact SVD may be derived through sequential column updates, as has been outlined hereinabove.

As the processing of the excess tokens proceeds, the inner dimension of the resultant diagonal matrix may be reduced accordingly to maintain its preset maximum size. This may be accomplished by reducing the size of the left orthonormal matrix, U, by dropping a column, and by reducing the size of the right orthonormal matrix, $V^T$, by dropping a row. A(z), z=1, . . . D-1 are intermediate attention matrices, where A(z=0) is the first attention matrix determined from the first N input tokens, and the A(z=D) is the last attention matrix. A stepwise operation may be performed at each excess input token until an EOS has been sensed (at z=D+1). At each step between the first and the last determinations of the attention matrix, a context vector may be formed from the current excess input token and may be combined with the previous step's attention matrix, and this extended attention matrix may undergo a decomposition to reduce its rank. This operation may yield, concomitantly, an adjusted set of singular values containing portions of the information derived from all context vectors produced up until the current step. The last attention matrix A(z=D) may then be used to improve the quality of the decoding process to yield the output tokens.

In some embodiments, an SVD may be performed which yields matrices U, S, and V, in which the diagonal elements of S less than a certain value may be set to zero and to yield a new matrix S'. From this, a reduced attention matrix may be represented by $A'=US'V^T$. Some of the features that existed in the full SVD may now be set to zero and can be removed, mostly without any penalty in performance. In some embodiments, as will be described in greater detail below, the full SVD may be performed on a secondary computing device (e.g., alternative computing device 406 of FIG. 4) separate from a primary computing device and the values of the reduced attention matrix A' may be communicated to a primary computing device (e.g., computing device 402 of FIG. 4). In alternative embodiments, the SVD may be calculated on a primary computing device (e.g., computing device 402 of FIG. 4) when physical memory is available. The results of the S' determination may be subsequently stored for use when physical memory is appropriately limited.

In addition, the systems and methods described herein may improve the functioning of a computing device by reducing the resources required for performing a machine translation on a computing device, freeing up additional computing resources for other tasks.

Figure 3:
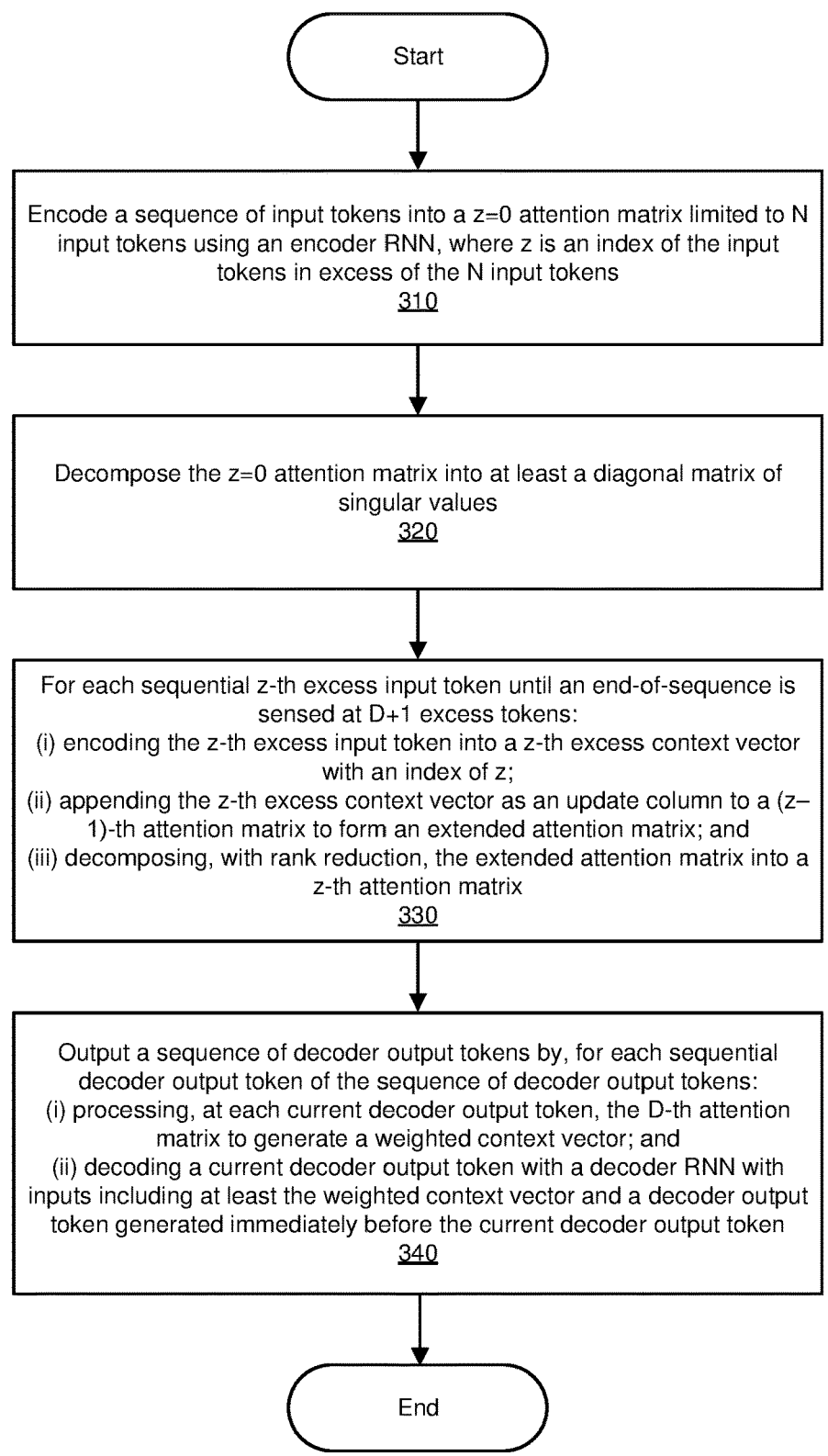
FIG. 3 is a flow diagram of an exemplary method for translating with limited attention, in accordance with some embodiments.

The following will provide, with reference to FIG. 3, detailed descriptions of exemplary methods for translating with limited attention. Detailed descriptions of an exemplary system for implementing a translation with limited attention may be provided in connection with FIG. 4.

FIG. 3 is a flow diagram of an exemplary computer-implemented method 300 for encoder-decoder translation with limited attention. The steps shown in FIG. 3 may be performed by any suitable computer-executable code and/or computing system, including the systems illustrated in FIGS. 1, 2, 4 and/or 5. In one example, each of the steps shown in FIG. 3 may represent an algorithm whose structure includes and/or may be represented by multiple sub-steps, examples of which may be provided in greater detail below.

As exemplified in FIG. 3, at step 310, one or more of the systems described herein may encode a sequence of N input tokens into a z=0 attention matrix (i.e., a first attention matrix) limited to N input tokens using an encoder RNN, where z is an index of the input tokens in excess of the N input tokens. For example, an encoder module 408 of FIG. 4 may encode, into a set of intermediate states, an input sequence including a set of words or an input sequence of tokens. The set of intermediate states (e.g., intermediate states $h_i$ shown in FIG. 2) may be formalized in the guise of an attention matrix. The input sequence (e.g., sequence of input vectors $x_i$ shown in FIG. 2) may be considered to be a time-ordered discretization, and thus the variable t may represent a discrete step in a sequence of discrete steps, as well as an integer counter i. The encoder 110 of FIG. 2 may transform or translate the set of input tokens $x_i$ using at least an encoder RNN (see encoder RNN stage 102 in FIG. 2), and thus may populate the intermediate states $h_i$, in this example, as a vector, of the at least one RNN. This vector may represent the input sequence in the internal intermediate language of the encoder RNN.

At step 310, a sequence which includes at least N input tokens may be partially transformed by an encoder RNN into a set of intermediate states, and in some embodiments, this may be the first or z=0 attention matrix A(0). The input sequence may include an additional D tokens after the first N tokens. For example, an encoder module 408 of FIG. 4 or a subsystem thereof may, by encoder 110 of FIG. 2, partially transform a sequence including N input tokens (e.g., input vectors $x_i$ in FIG. 2) into a set of context vectors C. As this first attention matrix has been designed, for example, for only for N input tokens, the size of that matrix may need to be reduced before the additional D input tokens may be encoded and that additional information incorporated into a subsequent iteration of the attention matrix. The number of intermediate states and/or context vectors may be the same, greater than, or less than the number of input tokens in the input sequence.

The systems described herein may perform step 310 in a variety of contexts. In one example, the systems described herein may identify a neural network that is trained on one or more servers and performs tasks on one or more remote devices. In at least one embodiment, the systems described herein may identify a neural network that is trained to recognize the language of the input sequence, such as German, French, or Farsi. In another example, the systems described herein may identify a neural network that is trained to perform speech recognition or translation.

In additional or alternative embodiments, the encoder may include two RNN's which function as a bidirectional RNN: one forward network, and one reverse network. In the forward network, the encoder receives the input sequence of vectors as $(x_1, x_2, \ldots, x_m)$, producing a set of intermediate state vectors of the type $h^f = \{h^f_1, h^f_2, \ldots, h^f_m\}$. In the reverse network, the input sequence of vectors is input to the encoder in the reverse order, or $(x_m, \ldots, x_2, x_1)$, producing a reverse set of intermediate state vectors of the type $h^r = \{h^r_m, \ldots, h^r_2, h^r_1\}$. These two sets may then be concatenated to form a context vector set: $c_t = [h^f, h^r]$. Such a context set may improve the quality of the translation in increasing the value of an associated likelihood function. In one embodiment, the set of context vectors as defined by the concatenations, may form the attention matrix.

At step 320 of FIG. 3, the z=0 attention matrix may be decomposed into at least a diagonal matrix of singular values. The systems described herein may perform step 320 in a variety of contexts. For example, an encoder module 408 and/or an attention matrix module 410 of FIG. 4 may decompose the z=0 attention matrix A(z=0) into a diagonal matrix of singular values.

Figure 4:
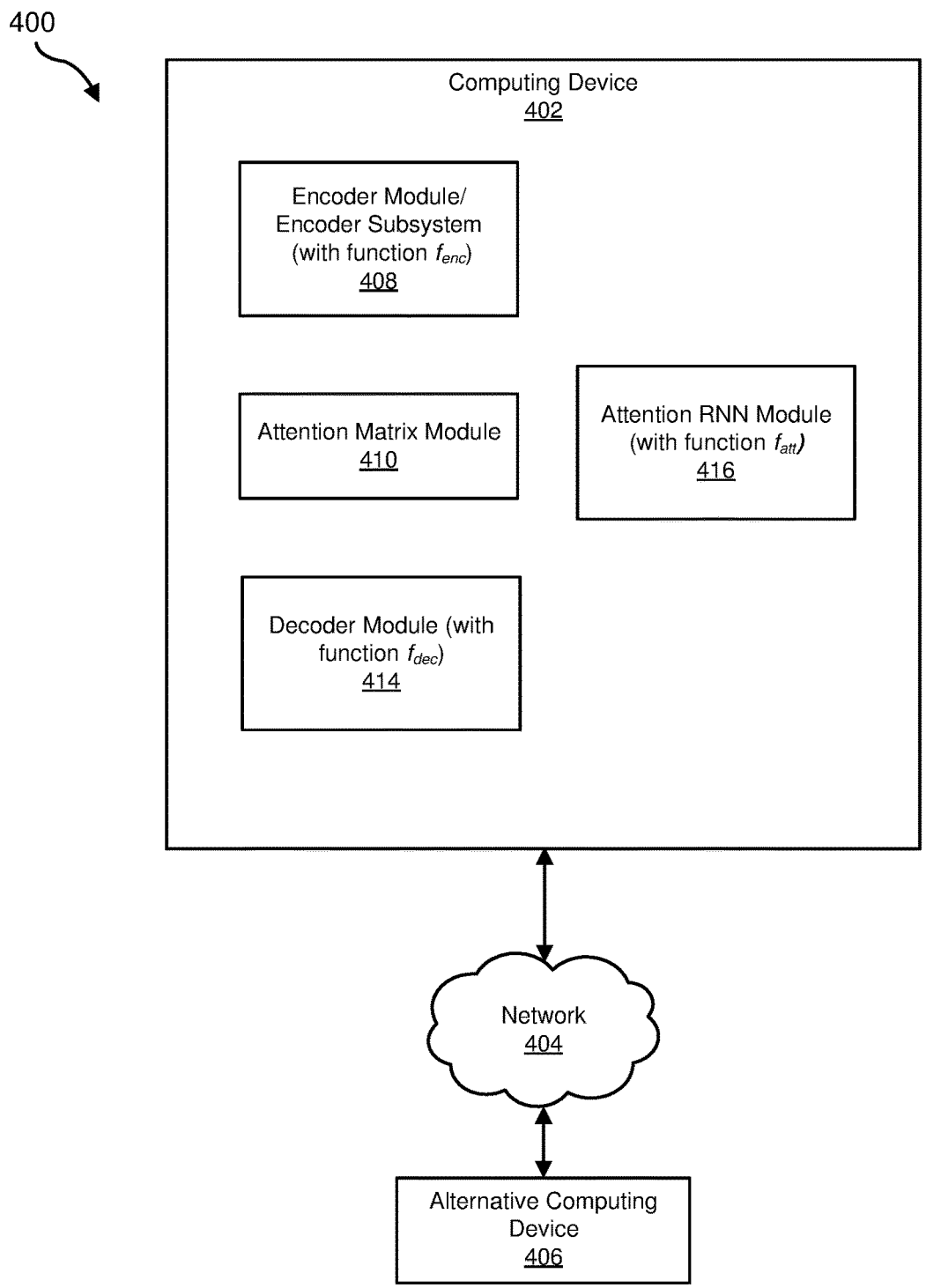
FIG. 4 is a block diagram of an exemplary computing system for translating with limited attention, in accordance with some embodiments.

At step 330 of FIG. 3, each sequential z>0 (i.e., each z-th excess input token) may be processed by, for example, an attention matrix module 410 in FIG. 4. The systems described herein may perform step 330 in a variety of contexts. In some embodiments, attention matrix module 410 may, by encoder 110 of FIG. 2, encode each z-th excess input token into a z-th excess context vector with an index of z (e.g., a z-th excess context vector $C_z$). The z-th excess context vector may be appended as an update column to a (z−1)-th attention matrix to form an extended attention matrix. For example, attention matrix module 410 may append the excess context vector $C_z$, as the last column, to the previously-determined attention matrix A(z−1) to form an extended attention matrix represented by [A(z−1), $C_z$]. For z=1, A(z=0) may be the first attention matrix derived from the processing by the encoder RNN (e.g., attention matrix module 410) of the first N input tokens. The extended attention matrix may then be decomposed, with rank reduction, into a z-th attention matrix. Thus, the A(z) attention matrix may be of a lower rank than that of the A(z−1) attention matrix. For example, attention matrix module 410 may decompose the extended attention matrix into singular values, which may include a reduction in rank of the current attention matrix, to form the current attention matrix A(z). This process may continue until the final attention matrix has been produced=A(z=D). This last matrix may contain the most important information supplied by all of the context vectors (i.e., at least N+D context vectors) that may be used in the processing of the output sequence.

In at least one example, each of the z-th attention matrices A(z) for z>0 may be decomposed by at least one of a compact singular value decomposition, a truncated singular value decomposition, a thin singular value decomposition, a QR decomposition, or a principal component analysis as described herein.

In FIG. 3, at step 340, a sequence of decoder output tokens may be output by, for each sequential decoder output token of the sequence of decoder output tokens, (i) processing, at each current decoder output token, the D-th attention matrix (i.e., the A(z=D)=final attention matrix) to generate a weighted context vector, and (ii) decoding a current decoder output token with a decoder RNN with inputs including at least the weighted context vector and a decoder output token generated immediately before the current decoder output token. For example, decoder module 414 and/or attention RNN module 416 of FIG. 4 may, by decoder 112 and/or attention RNN 202 of FIG. 2, output a sequence of decoder output tokens (e.g., output vectors $y_i$ and/or output vectors $y'_i$ in FIGS. 1 and 2). In some examples, for each sequential decoder output token of the sequence of decoder output tokens, attention RNN module 416 may, at each current decoder output token, process the final or last version of the attention matrix=$A(z=D)$ to generate a weighted context vector. In some examples, the $A(z=D)$ attention matrix may be processed with an attention RNN module 416 of FIG. 4 using, for example, attention RNN 202 of FIG. 2 that yields a score that signifies the relevancy of a component of the $A(z=D)$ attention matrix to the output token. Resulting scores may then be processed into probabilities, in some embodiments, using a function, such as that of softmax. The probabilities may be used as weights for the components of the $A(z=D)$ attention matrix. The weighted components may then be processed to yield a single weighted context vector.

In some embodiments, attention RNN module 416 may derive the weighted context vector by, for example, processing the A(D) attention matrix with attention RNN 202 into a set of scores. In this example, attention RNN module 416 may convert the set of scores into a set of probabilities. Additionally, attention RNN module 416 may process each column of the A(D) attention matrix with a probability from the set of probabilities to yield the weighted context vector. In some examples, at least one of the encoder RNN (e.g., of encoder 110), the attention RNN 202, or the decoder RNN (e.g., of decoder 112) may include a plurality of RNNs, each RNN with its own set of intermediate states and one or more memory cells. Additionally, or alternatively, at least one of the encoder RNN, the attention RNN, or the decoder RNN may include a plurality of long short-term memory layers (LSTM) arranged in a stack. In some embodiments, only the largest scores above a predetermined limit may be converted into the set of probabilities and all scores lower than the predetermined limit may be set to zero.

Additionally, at step 340, for each sequential decoder output token of the sequence of output tokens, a current decoder output token may be decoded with a decoder RNN with inputs including at least the weighted context vector and a decoder output token generated immediately before the current decoder output token. For example, decoder module 414 of FIG. 4 may, by decoder 112 of FIG. 2, decode a current output token (e.g., output vectors $y_i$ and/or output vectors $y'_i$ in FIGS. 1 and 2) with inputs including at least the weighted context vector of attention RNN 202 and a decoder output token (e.g., output vector $y_{(i-1)'}$ in FIG. 2) generated immediately before the current decoder output token.

In FIG. 3, at step 340, the weighted context vector may be input to the decoder 112 of FIG. 2 as will be the immediately previous value of the decoder hidden state $H_{(i-1)'}$ to yield the current output token $y'_i$. The step 340 may be sequentially repeated until a special stop signal (e.g., EOS) is sensed. The end product of these sequential operations may be the sequence of output tokens $y'_i$.

In at least one embodiment, the decomposition/rank-reduction procedure may be accomplished by a software algorithm operating on any one of a specially designed accelerator, a central processor unit (CPU), a graphics processor unit (GPU), a field programmable gate array (FPGA), or an application specific integrated circuit (ASIC). In some embodiments, special hardware may be configured to provide special matrix operations, reducing a matrix of one rank to a matrix of a lower rank, vector operations, particular element-wise mathematical operations such as element-wise dot product into single operation functionality to provide faster responses. Alternatively or additionally, several of the aforementioned operations may be performed on a separate computing device, such as alternative computing device 406 in FIG. 4, and the results communicated by an exemplary network system.

FIG. 4 is a block diagram of an exemplary computing system 400 for translating with limited attention. As illustrated in this figure, exemplary system 400 may include one or more modules for performing one or more tasks. In at least one embodiment, computing system 400 may include a computing device 402 and an alternative computing device 406. In various embodiments, computing device 402 may generally represent any type or form of computing device capable of reading computer-executable instructions and/or capable of executing. Examples of computing device 402 include, without limitation, application servers and database servers, exemplary computing system 510 in FIG. 5, combinations of one or more of the same, and/or any other suitable computing device. In some examples, computing device 402 may be trained for translation. This means that for a certain natural language translation, the parameters, weights, biases, etc. may have been pre-determined by training to translate a first language into a second language. Thus, at a minimum two RNNs have been trained: one for the encoder and for the decoder. With an attention mechanism, at least one additional RNN (the attention RNN) is present and has been jointly trained with the encoder RNN and the decoder RNN for translating a first language into a second language. The parameters, weights, biases, etc. for any of the RNNs present in the translating device may have been determined on another computing device and then subsequently transferred.

In some examples, alternative computing device 406 may be a computing device operated by an end user. Examples of computing devices may include, without limitation, desktops, laptops, tablets, smartphones, smart clothing, wearable devices (e.g., smart watches, smart glasses, etc.), embedded devices, gaming systems, Internet-of-Things devices (e.g., smart appliances, etc.), variations or combinations of one or more of the same, and/or any other suitable computing device. In some embodiments, alternative device 406 may have limited computing resources compared to a trained computing device. For example, the systems described herein may have utilized one or more neural networks and/or SVD computations on a one computing device and then sends the results obtained therefrom to an alternative computing device. For example, alternative computing device 406 may be a mobile phone that may only download a limited amount of data per month due to a cellular data plan and also possesses limited memory for computations associated with the attention matrix, including the SVDs, and the incremental updates to the SVD results.

In some embodiments, computing device 402 may communicate with alternative computing device 406 via a network 404. In certain embodiments, the alternative computing device 406 may be the computing device that performs the translation using limited attention. In some embodiment, an updating procedure, after an SVD has been performed, may be performed on the alternative computing device 406. Network 404 may generally represent any medium or architecture capable of facilitating communication or data transfer. Examples of network 404 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 510 in FIG. 5, or the like. Network 404 of FIG. 4 may facilitate communication or data transfer using wireless or wired connections. In one embodiment, network 404 may facilitate communication between computing device 402 and server 406 as illustrated in FIG. 4.

In one embodiment, the computing device 402 may include an encoder module 408, stored in memory, that may receive stepwise an input sequence of words or an input sequence of tokens (e.g., input vectors $x_i$). The encoder module 408 using, for example, the encoder 110 in FIG. 2, which may include encoder stage 102 including one or more encoder RNNs, may create a set of intermediate states (e.g., intermediate states $h_i$) parameterized as a set of vectors. The vectors may become the columns of the first attention matrix.

Should the number of input tokens exceed the maximum of N tokens (i.e., D>0), then the attention matrix may be reduced accordingly as outlined hereinabove. This reduction may be performed by the attention matrix module 410, stored in memory. The input matrix may be a first attention matrix and the output may be the last or final attention matrix, of lower rank than that of the first attention matrix. The reduction in rank may be dependent on the size of the excess of input tokens (=D) as discussed hereinabove.

The computing device 402 may also include an attention RNN module 416, stored in memory, as shown in FIG. 4. The attention RNN module 416, operating in conjunction with the decoder module 414, may utilize attention RNN 202 to, for each of the decoder output tokens, (i) score, using an attention RNN, the relevancy of each of intermediate state of a portion of the intermediate states, and (ii) convert those scores into weighting probabilities, which yields a weighted context vector for that decoder output token. The total number of attention weights may be limited to k values. In some embodiments, the maximum number of k values may be limited by two limitations: (i) the size of the physical memory present in the computing device 402 or the alternative computing device 406 and (ii) the length of the input sequence, or equivalent, the number of input words or tokens that will fit into the available physical memory allocated.

Additionally, as shown in FIG. 4, the computing device 402 may include a decoder module 414. After determination of the attention weights, the decoder module 414, stored in memory, may receive, at decoder 112 in FIG. 2, inputs including the weighted context vector and the immediately previous decoder hidden state (e.g., hidden state vector $h_3$ shown in FIG. 2) to produce, using at least one decoder stage 108 including one or more decoder RNNs, the final output tokens (e.g., output vectors $y'_i$). This process may continue until a special token (e.g., an EOS token) has been sensed, the special token indicating the end of sequence. In the training sessions that precede translations, any and all of the encoder RNNs, attention RNNs, decoder RNNs of encoder 110, decoder 112, and attention RNN 202, respectively, may have been jointly trained.

In some examples, the encoder 110, the decoder 112, and/or the attention RNN 202 may include a sequence of RNNs in which additional RNNs may be stacked above the first (or bottom) RNN. In alternative or additional embodiments, the sequence of RNNs may include both forward and backward RNNs (bi-directional RNNs). In some examples, the one or more encoder RNNs may contain memory cells. In some embodiments, such cells may be of the form of a gated recurrent unit (GRU) or of long short-term memory (LSTM). In some examples, the additional RRNs may be a sequence of RNNs. In some examples, RNNs may include memory cells of the GRU or LSTM configuration.

As discussed in connection with method 300 of FIG. 3 above, the systems and methods described herein may provide for a mechanism to achieve a quality translation while not exceeding the physical memory allocated for the translation and/or task. By reducing the set of attention weights actually used in the calculation of the weighted context vector to a subset of the original set, the translation may proceed within the confines of the physical memory allocated and produce a quality translation.

Figure 5:
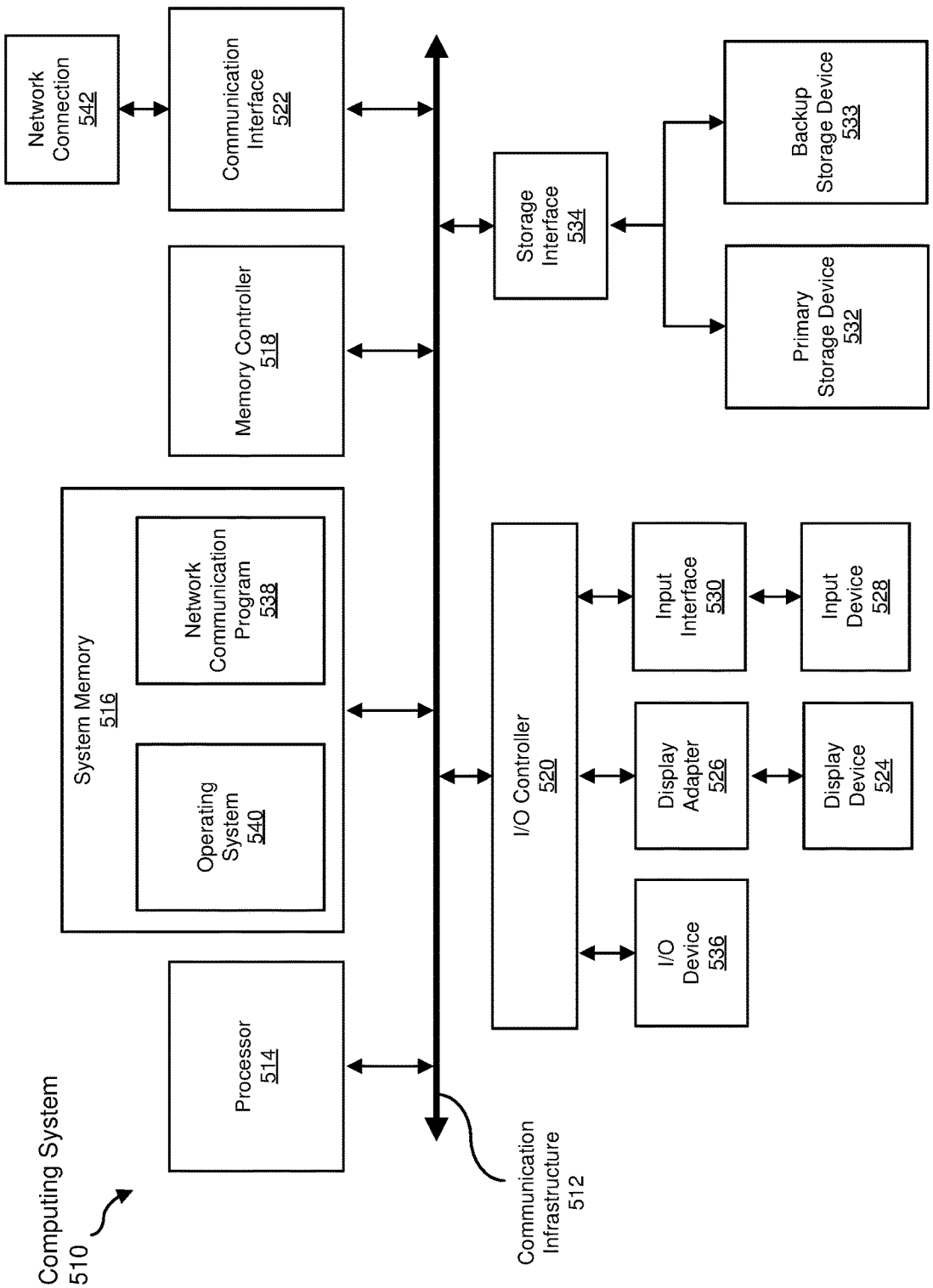
FIG. 5 is a block diagram of an exemplary computing system capable of implementing one or more embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 5). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below).

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O)

controller 520, and a communication interface 522. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally, or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a speaker, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fiber-Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally, or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 5. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid-state drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," in some examples, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally, or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

The present disclosure may provide hardware support, in an inference accelerator, that records the minimum and maximum values for each activation and layer parameter during inference for a neural network. The minimum and maximum values may be stored in machine-specific registers accessible to firmware. After each invocation of the inference on a specific dataset, the firmware may read the minimum and maximum values for each layer from the registers, compute a new range, and update the quantization procedure with the new range. The firmware may use machine learning techniques to find an ideal interval to optimize the neural network and further improve the efficacy of the machine learning accelerator. Thus, the bit width of the arithmetic operations for the layers may be reduced, which may speed up computation, reduce memory usage, and (over time) achieve an optimized quantization.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," in some examples, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," in some examples, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data, such as weights and other values, to be transformed, transform the data, output a result of the transformation to store and be later accessed, use the result of the transformation to determine a scaling factor, and store the result of the transformation to apply quantization on a subsequent inference. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," in some examples, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for translating with limited attention a sequence of input tokens into a sequence of output tokens while not exceeding memory allocated for translation, at least a portion of the method being performed by a computing device comprising at least one processor that includes physical memory, the method comprising:
    encoding a sub-sequence of N input tokens into a size-N attention matrix using an encoder recurrent neural network (RNN) from a sequence of input tokens that has a length that exceeds boundaries of the memory allocated for translation;
    decomposing the size-N attention matrix into at least a diagonal matrix of singular values;
    for each sequential excess input token in the sequence of input tokens beyond the sub-sequence until an end-of-sequence is sensed:
    encoding the excess input token into an excess context vector;
    appending the excess context vector as an update column to the size-N attention matrix to form an extended attention matrix; and
    decomposing, with rank reduction and to eliminate highly correlated data while avoiding operational failures due to the length of the sequence of input tokens exceeding the boundaries of the memory allocated for translation, the extended attention matrix to size N; and
    outputting a sequence of decoder output tokens by, for each sequential decoder output token of the sequence of decoder output tokens:
    processing, at each current decoder output token, the extended attention matrix to generate a weighted context vector; and
    decoding a current decoder output token with a decoder RNN with inputs comprising at least the weighted context vector and a decoder output token generated immediately before the current decoder output token.

2. The method of claim 1, further comprising deriving the weighted context vector at each current decoder output token by:
    processing the extended attention matrix with an attention RNN into a set of scores;
    converting the set of scores into a set of probabilities;
    processing each column of the extended attention matrix with a probability from the set of probabilities; and
    processing the columns of the extended attention matrix to yield the weighted context vector.

3. The method of claim 2, wherein at least one of the encoder RNN, the attention RNN, or the decoder RNN comprises a plurality of RNNs, each RNN with its own set of intermediate states and one or more memory cells.

4. The method of claim 2, wherein at least one of the encoder RNN, the attention RNN, or the decoder RNN comprise a plurality of long short-term memory layers (LSTM) arranged in a stack.

5. The method of claim 2, wherein only largest scores above a predetermined limit are converted into the set of probabilities and all scores lower than the predetermined limit are set to zero.

6. The method of claim 1, wherein the computing device is a CPU, GPU, FPGA, or ASIC.

7. The method of claim 1, wherein the decomposing is performed by at least one of a compact singular value decomposition, a truncated singular value decomposition, a thin singular value decomposition, a QR decomposition, or a principal component analysis.

8. The method of claim 1, wherein the encoder RNN is bi-directional.

9. The method of claim 1, wherein the sequence of input tokens comprises at least one of language-based text or audio signals.

10. A system for translating with limited attention a sequence of input tokens into a sequence of output tokens while not exceeding memory allocated for translation, the system comprising:
    at least one physical processor; and
    physical memory comprising computer-executable instructions that, when executed by the at least one physical processor, cause the at least one physical processor to perform acts comprising:
    encoding a sub-sequence of N input tokens into a size-N attention matrix using an encoder recurrent neural network (RNN) from a sequence of input tokens that has a length that exceeds boundaries of the memory allocated for translation;
    decomposing the size-N attention matrix into at least a diagonal matrix of singular values;
    for each sequential excess input token in the sequence of input tokens beyond the sub-sequence until an end-of-sequence is sensed:
    encoding the excess input token into an excess context vector;
    appending the excess context vector as an update column to the size-N attention matrix to form an extended attention matrix; and
    decomposing, with rank reduction and to eliminate highly correlated data while avoiding operational failures due to the length of the sequence of input tokens exceeding the boundaries of the memory allocated for translation, the extended attention matrix to size N;

outputting a sequence of decoder output tokens by, for each sequential decoder output token of the sequence of decoder output tokens:
- processing, at each current decoder output token, the extended attention matrix to generate a weighted context vector; and
- decoding a current decoder output token with a decoder RNN with inputs comprising the weighted context vector and a decoder output token generated immediately before the current decoder output token.

11. The system of claim 10, further comprising computer-executable instructions that, when executed by the at least one physical processor, cause the at least one physical processor to perform an act comprising deriving the weighted context vector at each current decoder output token by:
- processing the extended attention matrix with an attention RNN at each current decoder output token into a set of scores;
- converting the set of scores into a set of probabilities;
- processing each column of the extended attention matrix with a probability from the set of probabilities; and
- processing the columns of the extended attention matrix to yield the weighted context vector.

12. The system of claim 11, wherein at least one of the encoder RNN, the attention RNN, or the decoder RNN comprises a plurality of RNNs, each RNN with its own set of intermediate states and one or more memory cells.

13. The system of claim 11, wherein only largest scores above a predetermined limit are converted into the set of probabilities and all scores lower than the predetermined limit are set to zero.

14. The system of claim 11, wherein at least one of the encoder RNN, the attention RNN, or the decoder RNN comprise a plurality of long short-term layers (LSTM) arranged in a stack.

15. The system of claim 11, wherein the at least one physical processor is included in at least one of a CPU, a GPU, a FPGA, an ASIC.

16. The system of claim 10, further comprising computer-executable instructions that, when executed by the at least one physical processor, cause the at least one physical processor to perform the act of decomposing, for each sequential excess input token in the sequence of input tokens beyond the sub-sequence until the end-of-sequence is sensed, the extended attention matrix to size N by using at least one of a compact singular value decomposition, a truncated singular value decomposition, a thin singular value decomposition, a QR decomposition, or a principal component analysis.

17. The system of claim 10, wherein the encoder RNN is bi-directional.

18. The system of claim 10, wherein the sequence of input tokens comprises at least one of language-based text or audio signals.

19. A non-transitory computer-readable medium comprising one or more computer-readable instructions that, when executed by at least one processor of a computing device, cause the computing device to translate with limited attention a sequence of input tokens into a sequence of output tokens while not exceeding memory allocated for translation by performing acts comprising:
- encoding a sub-sequence of N input tokens into a size-N attention matrix using an encoder recurrent neural network (RNN) from a sequence of input tokens that has a length that exceeds boundaries of the memory allocated for translation;
- decompose the size-N attention matrix into at least a diagonal matrix of singular values;
- for each sequential excess input token in the sequence of input tokens beyond the sub-sequence until an end-of-sequence is sensed:
- encode the excess input token into an excess context vector;
- append the excess context vector as an update column to the size-N attention matrix to form an extended attention matrix;
- decompose, with rank reduction and to eliminate highly correlated data while avoiding operational failures due to the length of the sequence of input tokens exceeding the boundaries of the memory allocated for translation, the extended attention matrix to size N; and
- output a sequence of decoder output tokens by, for each sequential decoder output token of the sequence of decoder output tokens:
  - processing, at each current decoder output token, the extended attention matrix to generate a weighted context vector; and
  - decoding a current decoder output token with a decoder RNN with inputs comprising at least the weighted context vector and a decoder output token generated immediately before the current decoder output token.

20. The non-transitory computer-readable medium of claim 19, wherein the weighted context vector for each current decoder output token is derived by:
- processing the extended attention matrix with an attention RNN into a set of scores;
- converting the set of scores into a set of probabilities;
- processing each column of the extended attention matrix with a probability from the set of probabilities; and
- processing the columns of the extended attention matrix to yield the weighted context vector.

* * * * *